(12) United States Patent
Kronpass

(10) Patent No.: US 10,527,029 B2
(45) Date of Patent: Jan. 7, 2020

(54) AXIAL PISTON PUMP

(71) Applicant: HYDAC DRIVE CENTER GMBH, Langenau (DE)

(72) Inventor: Manuel Kronpass, Tittling (DE)

(73) Assignee: HYDAC DRIVE CENTER GMBH, Langenau (DE)

( * ) Notice: Subject to any disclaimer, the term of this patent is extended or adjusted under 35 U.S.C. 154(b) by 204 days.

(21) Appl. No.: 14/891,383

(22) PCT Filed: May 15, 2014

(86) PCT No.: PCT/EP2014/001323
§ 371 (c)(1),
(2) Date: Nov. 16, 2015

(87) PCT Pub. No.: WO2014/187546
PCT Pub. Date: Nov. 27, 2014

(65) Prior Publication Data
US 2016/0108901 A1    Apr. 21, 2016

(30) Foreign Application Priority Data

May 22, 2013  (DE) .................. 10 2013 008 629
May 22, 2013  (DE) .................. 10 2013 008 676
(Continued)

(51) Int. Cl.
*F04B 1/30*  (2006.01)
*F01B 3/10*  (2006.01)
(Continued)

(52) U.S. Cl.
CPC ............... *F04B 1/30* (2013.01); *F01B 3/103* (2013.01); *F01B 3/106* (2013.01); *F03C 1/0605* (2013.01);
(Continued)

(58) Field of Classification Search
CPC .......... F04B 1/303; F04B 1/30; F04B 1/2021; F04B 1/103; F04B 1/2064; F04B 1/2071;
(Continued)

(56) References Cited

U.S. PATENT DOCUMENTS 2,825,241 A    3/1958  Ferris
2,925,046 A    2/1960  Budzich
(Continued)

FOREIGN PATENT DOCUMENTS

DE    1 653 617    7/1971
DE    25 31 616    2/1977
(Continued)

OTHER PUBLICATIONS

Machine Translation of JPS5443302.*
International Search Report (ISR) dated Sep. 23, 2014 in International (PCT) Application No. PCT/EP2014/001323.

*Primary Examiner* — Alexander B Comley
(74) *Attorney, Agent, or Firm* — Wenderoth, Lind & Ponack, L.L.P.

(57) ABSTRACT

An axial piston pump, particularly for hydraulic systems, includes a cylinder drum (1) rotationally driven about an axis (15) in a pump housing (7). Piston cylinder units are arranged in the drum in a circle at an offset. Pistons (21) are at least indirectly supported on a swashplate (3) by their actuation end (31) accessible outside the cylinder drum (1). Between the swept volumes (19) of the piston cylinder units and a stationary fluid inlet and stationary fluid outlet of the pump housing (7), a control device (23) is arranged that has fluid channels (25, 26) for the targeted transfer of fluid from the fluid inlet into the swept volumes (19) and from the swept volumes (19) to the fluid outlet. At least one pressure compensation channel (28, 30) is provided in the control device (23), between the fluid channels (25, 26), to build or (Continued)

release fluid pressure in the swept volumes (19) in a targeted manner.

13 Claims, 5 Drawing Sheets

(30) Foreign Application Priority Data

| May 22, 2013 | (DE) | 10 2013 008 677 |
|---|---|---|
| May 22, 2013 | (DE) | 10 2013 008 678 |
| May 22, 2013 | (DE) | 10 2013 008 679 |
| May 22, 2013 | (DE) | 10 2013 008 681 |

(51) Int. Cl.

| F04B 1/20 | (2006.01) |
|---|---|
| F04B 53/14 | (2006.01) |
| F03C 1/28 | (2006.01) |
| F04B 1/12 | (2006.01) |
| F04B 1/32 | (2006.01) |
| F04B 11/00 | (2006.01) |
| F04B 27/08 | (2006.01) |
| F01B 3/00 | (2006.01) |
| F04B 19/22 | (2006.01) |
| F04B 1/22 | (2006.01) |

(52) U.S. Cl.
CPC ............ *F04B 1/124* (2013.01); *F04B 1/2021* (2013.01); *F04B 1/2035* (2013.01); *F04B 1/2064* (2013.01); *F04B 1/324* (2013.01); *F04B 11/0091* (2013.01); *F04B 53/14* (2013.01); *F01B 3/0085* (2013.01); *F04B 1/2078* (2013.01); *F04B 1/22* (2013.01); *F04B 19/22* (2013.01); *F04B 27/0878* (2013.01)

(58) Field of Classification Search
CPC ...... F04B 1/302; F04B 1/324; F04B 11/0091; F04B 49/08; F01B 3/106
USPC .............. 91/6.5, 505; 92/12.2, 13, 57
See application file for complete search history.

(56) References Cited

U.S. PATENT DOCUMENTS

| 3,208,397 | A | * | 9/1965 | Lehrer | F04B 1/2035 91/12 |
|---|---|---|---|---|---|
| 3,956,969 | A | * | 5/1976 | Hein | F04B 1/2042 91/6.5 |
| 4,028,010 | A | | 6/1977 | Hopkins | |
| 4,934,253 | A | | 6/1990 | Berthold et al. | |
| 5,553,378 | A | | 9/1996 | Parekh et al. | |
| 5,572,919 | A | * | 11/1996 | Ishizaki | F04B 1/2021 417/270 |
| 2002/0066364 | A1 | | 6/2002 | Skirde et al. | |
| 2003/0047066 | A1 | | 3/2003 | Damtew et al. | |

FOREIGN PATENT DOCUMENTS

| DE | 26 53 867 | | 6/1978 |
|---|---|---|---|
| DE | 31 35 605 | | 3/1983 |
| DE | 35 45 137 | | 7/1987 |
| DE | 36 02 651 | | 7/1987 |
| DE | 28 29 597 | | 9/1988 |
| DE | 40 28 852 | | 3/1991 |
| DE | 43 01 140 | | 7/1993 |
| DE | 40 24 319 | | 10/1993 |
| DE | 42 14 765 | | 11/1993 |
| DE | 44 15 510 | | 7/1995 |
| DE | 196 20 167 | | 3/1997 |
| DE | 197 06 114 | | 8/1998 |
| DE | 100 44 784 | | 4/2002 |
| DE | 102 35 813 | | 7/2004 |
| DE | 601 18 246 | | 3/2007 |
| DE | 10 2008 027 700 | | 12/2009 |
| DE | 10 2011 053 423 | | 2/2013 |
| EP | 0 320 822 | | 6/1989 |
| EP | 1 013 928 | | 6/2000 |
| EP | 1 293 668 | | 3/2003 |
| EP | 2 327 490 | | 6/2011 |
| FR | 2 785 525 | | 5/2000 |
| JP | 54-43302 | | 4/1979 |
| JP | S5443302 | * | 4/1979 |
| JP | 8-144941 | | 6/1996 |
| JP | 8-284805 | | 10/1996 |
| WO | 2009/129820 | | 10/2009 |

* cited by examiner

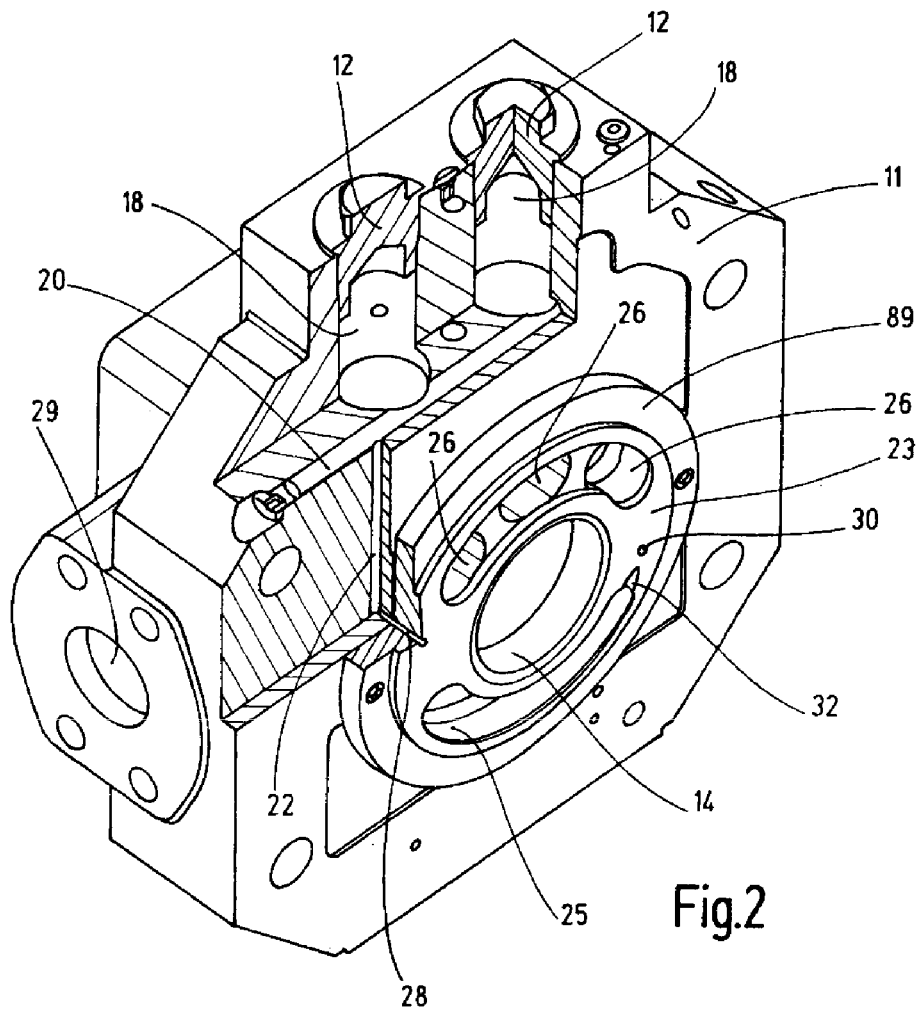
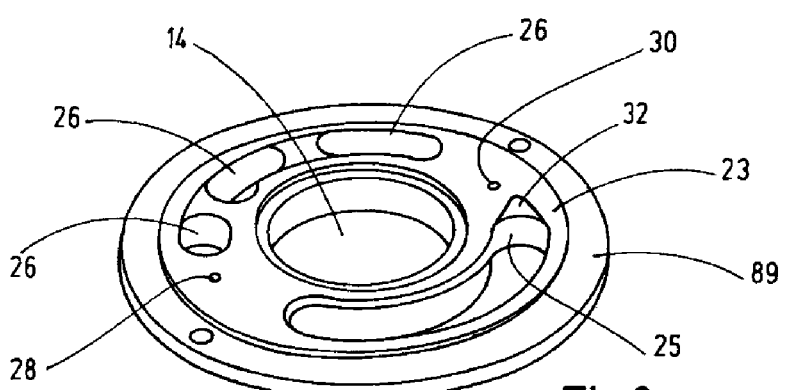

Legend

| German | English |
|---|---|
| OT | Upper part |
| UT | Lower part |
| ND | Low pressure |
| HD | High pressure |

Legend

| German | English |
|---|---|
| OT | Upper part |
| UT | Lower part |
| ND | Low pressure |
| HD | High pressure |

Legend

| German | English |
|--------|---------|
| OT | Upper part |
| UT | Lower part |
| ND | Low pressure |
| HD | High pressure |

AXIAL PISTON PUMP

FIELD OF THE INVENTION

The invention relates to an axial piston pump, in particular for hydraulic systems, having a drivable cylinder drum, rotating around an axis in a pump housing. The piston-cylinder units are arranged on a circle at an offset in the cylinder drum. The pistons are supported, at least indirectly, on a swash plate at their actuating ends, which ends are accessible from outside the cylinder drum. A controlling device is disposed between the swept volumes of the piston-cylinder units and a stationary fluid inlet and a stationary fluid discharge of the pump housing. The controlling device has fluid channels for the targeted transfer of fluid from the fluid inlet into the swept volumes and from the swept volumes to the fluid discharge.

BACKGROUND OF THE INVENTION

Axial piston pumps of this type represent the prior art. They are commonly used for the pressure medium supply to loads, such as operating cylinders, hydraulic motors, and the like. Axial piston pumps of the aforementioned type, in which the inclination of the swash plate relative to the rotational axis is adjustable, distinguish themselves from likewise known axial piston pumps with a fixed swash plate by a better energy balance in their operation. While pumps with a fixed swash plate, as fixed displacement pumps, always deliver a constant flow rate of the fluid at a given drive speed even when no power is requested by fluid-operated units. Therefore, the flow resistances in the hydraulic circuit must be overcome even during idle running, expending drive energy that provides no useful energy. The delivery volume can be set to zero, and the requirement for driving energy can be minimized through the adjustment of the swash plate inclination. An axial piston pump of this type is disclosed in DE 44 15 510 C1. Due to the successive strokes the pistons perform during operation, the pressure generated is not free from pressure pulsations, even if a larger number of piston-cylinder units is housed in the cylinder drum. When using such pumps, measures are needed for smoothing pressure pulses, for example in the form of pulsation dampers.

SUMMARY OF THE INVENTION

With regard to this difficulty, the invention addresses the problem of providing an axial piston pump that distinguishes itself with a comparatively smoother pressure course.

According to the invention, this problem is basically solved by an axial piston pump having at least one pressure equalization channel provided in a controlling device between the fluid channels for selectively establishing or releasing fluid pressure in the swept volumes. This arrangement opens up the possibility of minimizing pressure surges in the overflow of the control edges between cylinders and the pressure-side and suction-side fluid channels by initiating a corresponding pressure build-up via a pressure compensating channel before reaching a pressure-side fluid channel or initiating a pressure reduction via a compensating channel before reaching a suction-side fluid channel. In particular, this pressure build-up in the area of the transfer from the suction side to pressure side occurs more gently.

Preferably the arrangement is devised such that only one swept volume each is connectable with a high pressure source via the respective pressure compensating channel.

The high pressure source can be, for example, at least one compression chamber. That chamber may be integrated, for example, into the lower housing part of the pump housing, with which the controlling device comprising the fluid channels is connected.

Particularly advantageously, the respective pressure compensation channel can be arranged such that the connection to the respective swept volume can only be established after the connection from the fluid inlet to this swept volume is closed.

Furthermore, the pressure compensation channel can be arranged such that the connection from it to the respective swept volume is can be closed only after the connection from the fluid discharge to this swept volume is established.

For a targeted pressure release before the establishment of a connection of the respective swept volume space to the suction-side fluid channel, a second pressure compensation channel may be provided, by which only one swept volume at a time can be connected to a pressure sink. This pressure sink may be a tank that is part of an associated drainage system.

The pressure compensation channel leading to the pressure sink can be arranged such that the connection to the respective swept volume can be established only after the connection from the fluid discharge to this swept volume is closed.

With regard to the arrangement of this second pressure compensating channel, its connection from it to the respective swept volume can be established only after the connection of the fluid discharge to this swept volume is closed. The connection to the respective swept volume is closable only after the connection from the fluid inlet to this swept volume is established.

In particularly preferred embodiments, the controlling device comprises a stationary control disk, which preferably forms a floor for the swept volumes of the rotating piston-cylinder units. The control disk preferably further comprises kidney-shaped fluid channels for the establishment of connections to the piston-cylinder units.

In such embodiments, at least one pressure compensating channel is provided in the form of a bore in the control disk.

The control disk may be disposed on a connecting plate formed on the lower housing part of the pump housing. The respective compression chamber is provided in the connecting plate, and a connecting channel is provided from the compression chamber to the corresponding pressure compensating channel.

Preferably, the respective compression chamber is closed by a screw plug.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 2 is a perspective view partially in section of the lower housing part of the pump of FIG. 1, with a view on the control disk fixed to the connection plate of the lower housing part;

FIG. 3 is a perspective view of the separately shown control disk of FIG. 2.

DETAILED DESCRIPTION OF THE INVENTION

Figure 1:
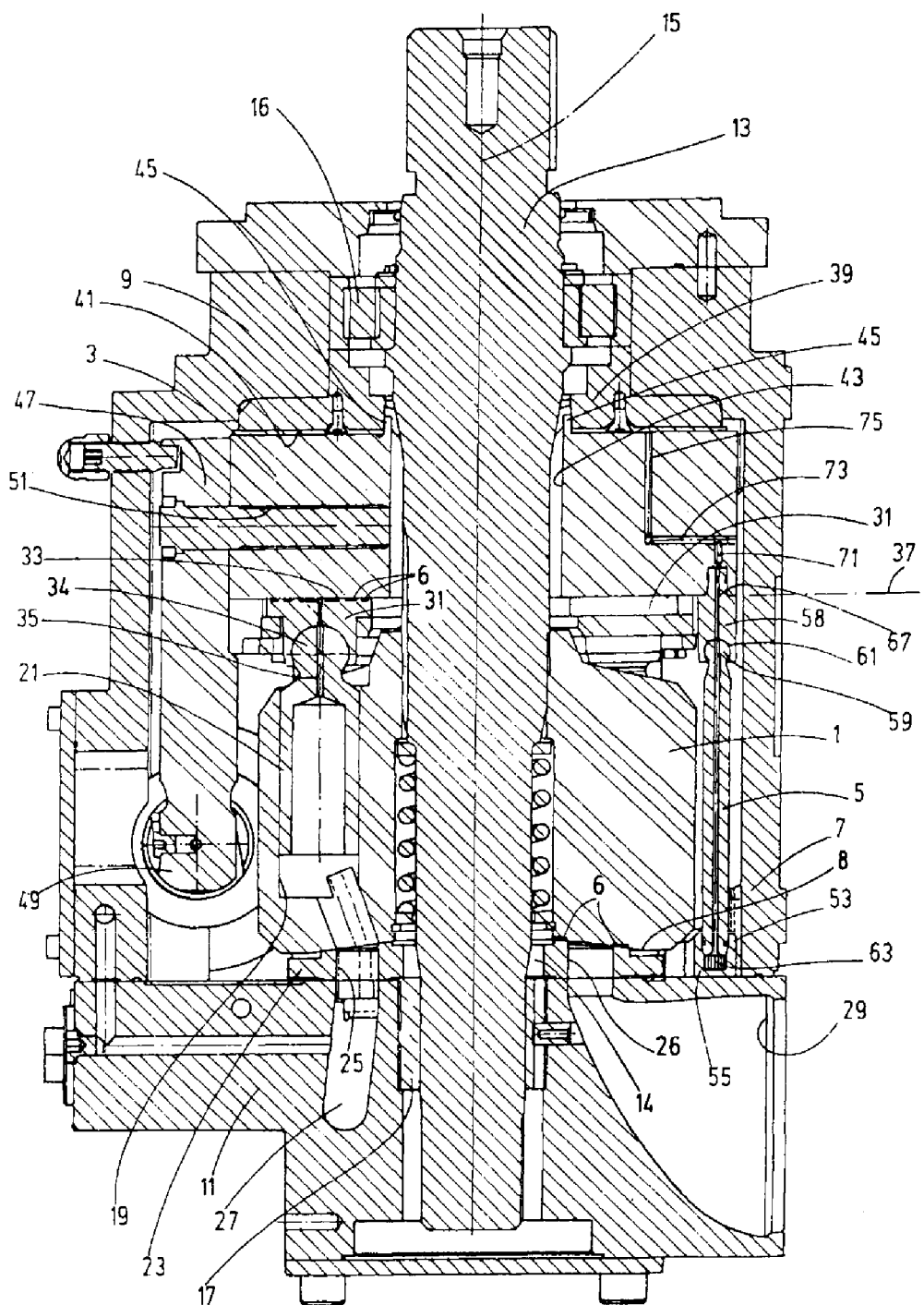
FIG. 1 is a side view in section of an axial piston pump according to an exemplary embodiment of the invention.

FIG. 1 shows an exemplary embodiment of an axial piston pump according to the invention with a swash plate design. In the manner common for axial piston pumps of this type, a rotatably drivable cylindrical drum 1 is provided in a pump housing 7 with a corresponding swash plate 3. Swash plate 3 is pivotable for adjustment of the flow rate. The system pressure that can be generated by the pump can then be adjusted. The pivot axis 37 of the swash plate 3 is shown in FIG. 1.

The pump housing 7 comprises an upper part 9, shown at the top in the drawing, and a lower part 11. A drive shaft 13 for the cylinder drum 1 is mounted in the upper part 9 in a tapered roller bearing 16 and in the lower part 11 by a slide bearing 17 for rotation about the axis 15. The cylinder chambers 19 of the cylinder drum 1 each have a piston 21 guided therein (in the section plane of FIG. 1, only one cylinder chamber 19 is visible), and are in contact with a control plate or control 23 on the end of each cylinder shown at the bottom in the drawing. The control plate 23 is in contact with the lower housing part 11. The control plate 23 comprises control openings of fluid channels 25 and 26 for the connections between suction-side connections 27 and pressure-side connections 29 into the cylinder chambers 19 of the cylinder drum 1. On its side located at the top in the drawing and facing the cylinder drum 1, the control plate 23, which is shown separately in FIGS. 2 and 3, is provided with a coating 24, see FIG. 2, which is produced by the process according to the invention and forms the bearing surface on which the slightly concave, curved bottom surface 8 of the cylinder drum 1 slides during its rotational movement. In FIG. 1, portions 6 of the coating 24 form the bearing points between a central passage 14 and adjacent control openings of fluid channels 25 and 26.

During the movement of the cylinder drum 1, the pistons 21 slide across a respective sliding block 31 on the sliding surface 33, which is located on the bottom side of the swash plate 3. The sliding blocks 31 are connected with the piston top side of the corresponding piston 21 in the manner of a ball joint. The ball joint is formed by a ball head 34 on the piston 21 and a ball socket 36 in the sliding block 31. The ball joint is secured by a crimp on the sliding block 31. Oil holes 35 in the ball head 34 and sliding block 31 provide access for fluids, such as hydraulic oil, for the lubrication of the sliding surface 33. Similar to the control plate 23, the sliding blocks 31 also comprise a coating 24 produced by the process according to the invention.

As mentioned above, the swash plate 3 is adjustable about the pivot axis 37, which lies in the plane of the sliding surface 33 of the swash plate 3, for setting the delivery volume. This pivot axis 37 is defined by the swash plate bearing formed between the swash plate 3 and the upper part 9. The swash plate bearing comprises a plastic bearing shell 39 on the upper part 9, on which the swash plate 3 is guided with a dome-shaped sliding surface 41. In the sliding surface 41, an upwardly conically flared opening 43 is formed in the swash plate 3 for the passage of the drive shaft 13. On both sides next to the opening 43, guide rails 45 protruding from the sliding surface 41 are provided as part of the swash plate bearing. For the pivotal movement of the swash plate 3 about the pivot axis 37, the side of the swash plate 3 on the left in FIG. 1 is screwed to a pivot lever 47, which pivot lever extends parallel to the axis 15 next to the cylinder drum 1 and which, on its end at the bottom in FIG. 1, is movable in the direction perpendicular to the drawing plane to effect a corresponding pivotal movement of the swash plate 3 about the pivot axis 37. The pivot lever 47 is screwed to the corresponding side of the swash plate 3 with an internal thread located in a drilled hole 51.

A joint tube 5 forms part of a feeding and pressing device and is arranged laterally next to the cylinder drum 1 in a direction parallel to the axis 15, as shown in FIG. 1. At its end at the bottom in FIG. 1, the joint tube 5 is mounted in a seat or receptacle 53 in a connection block 55 on the lower housing part 11. The receptacle 53 allows an axial displacement of the joint tube 5. The block 55 comprises a connection channel, not visible in FIG. 1, to the pressure side 29, which opens into the receptacle 53 of the joint tube 5. The upper end of the joint tube 5 is hinged to the swash plate 3 via a connecting piece 58 that is disposed laterally outside the sliding surface 33 on the bottom side of the swash plate 3. The joint connection is implemented by a type of ball joint and comprises a ball head 59 at the upper end of the joint tube 5, which ball head is mounted in a ball socket 61 of the connection piece 58. The joint tube 5 is braced against the swash plate 3 via the connecting piece 58. For this purpose, a laminated disk spring 63 is disposed between the lower end of the joint tube 5 and the bottom of the receptacle 53. A fluid passage 67 in the connecting piece 58 continues the fluid connection to the pressure side 29 through the tube opening on the ball head 59 and to the swash plate 3. The passage 67 of the connecting piece 58 is followed by lubrication channels 73, 75 formed in the swash plate 3, only some of which are visible in FIG. 1 and the vertical channels 75 of the swash plate 3 open into points of the sliding surface 41 suitable for the supply of lubricant to the swash plate mounting.

FIG. 2 shows the lower housing part 11 in an orientation in which the control plate 23 attached to the top of the lower housing part 11 and the lateral connection of the pressure side 29 are visible. On the side of the lower housing part 11 shown at the top in FIG. 2, two cylindrical compression chambers 18 are integrated into the housing wall, are closed with screw plugs 12 and are in connection with connecting holes or passages 20 and 22 at their inner end. A pressure compensating channel 28 opens into the passage 22 in the form of a narrow compression chamber bore, which is formed in the control disk 23. Approximately diametrically opposite of the compression chamber bore 28, another pressure compensation channel 30 is formed in the control disk 23 in the form of a relief hole, which also has a small cross section. At the end of the kidney-shaped fluid channel 25 adjacent to the relief hole 30, which fluid channel 25 is assigned to of the low pressure or suction connection or side 27, the opening edge has a flat section forming a control notch 32. The function of the compression chamber bore 28, the relief hole 30, and the control notch 32 will be discussed below in further detail with reference to the FIGS. 4 to 6.

Figure 4:
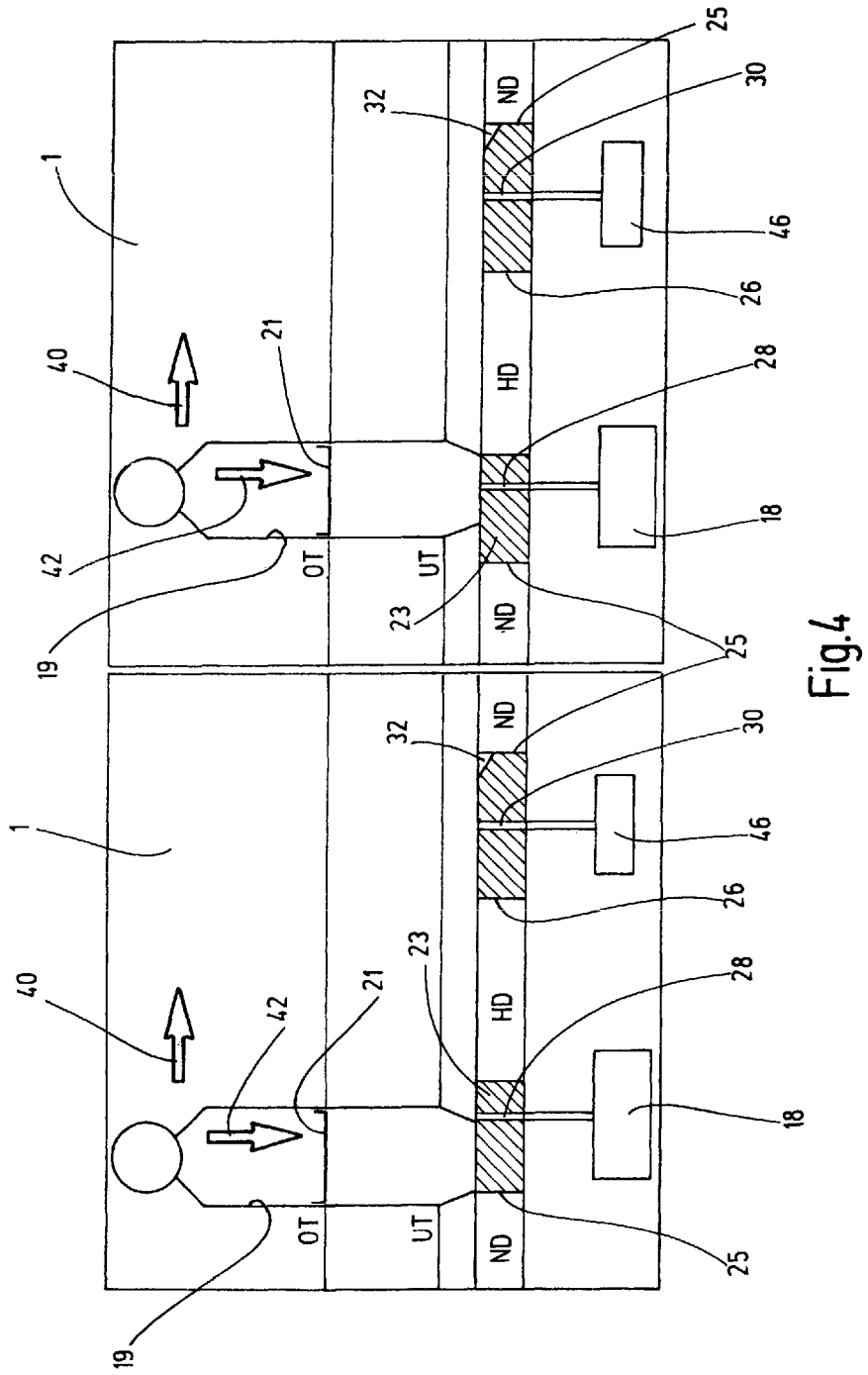
FIGS. 4 to 6 are schematic functional diagrams illustrating the operation of the axial piston pump of FIG. 1.
Figure 5:
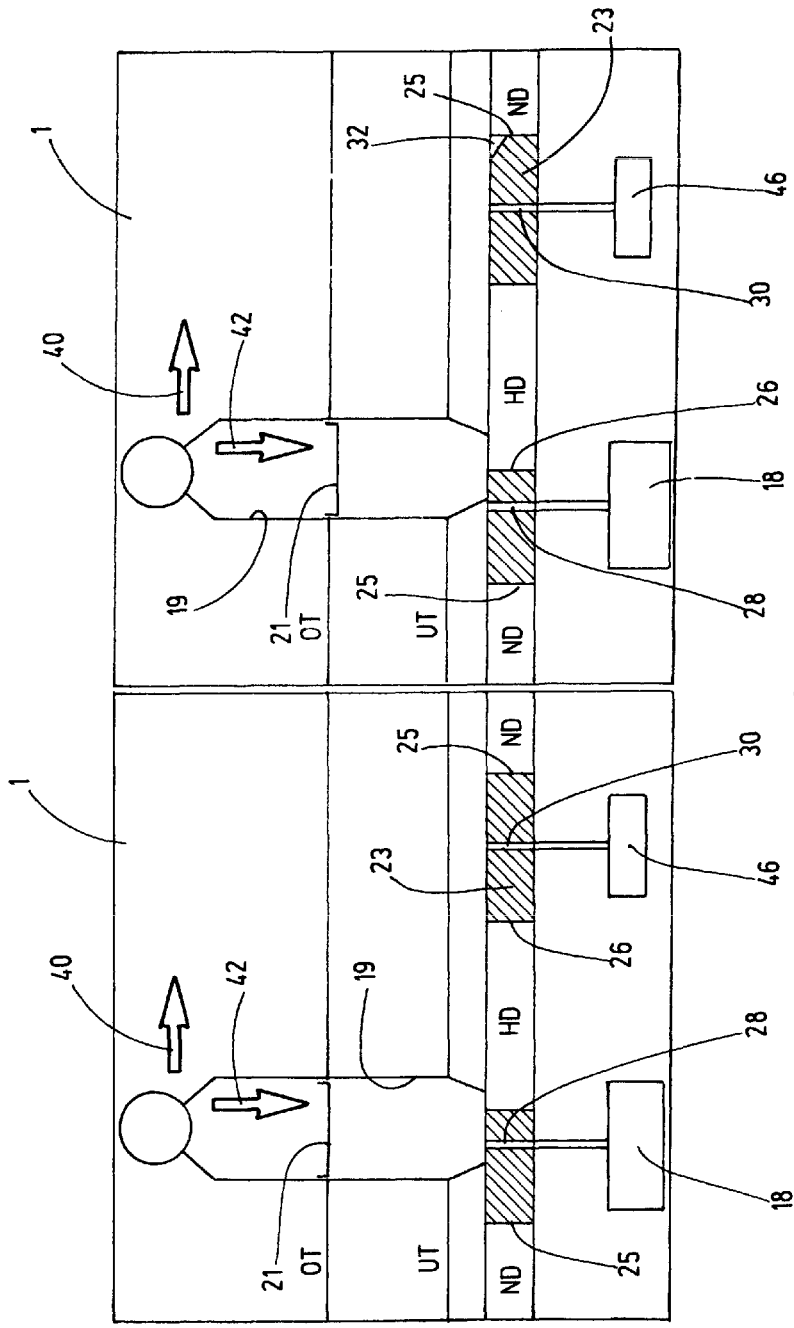
Figure 6:
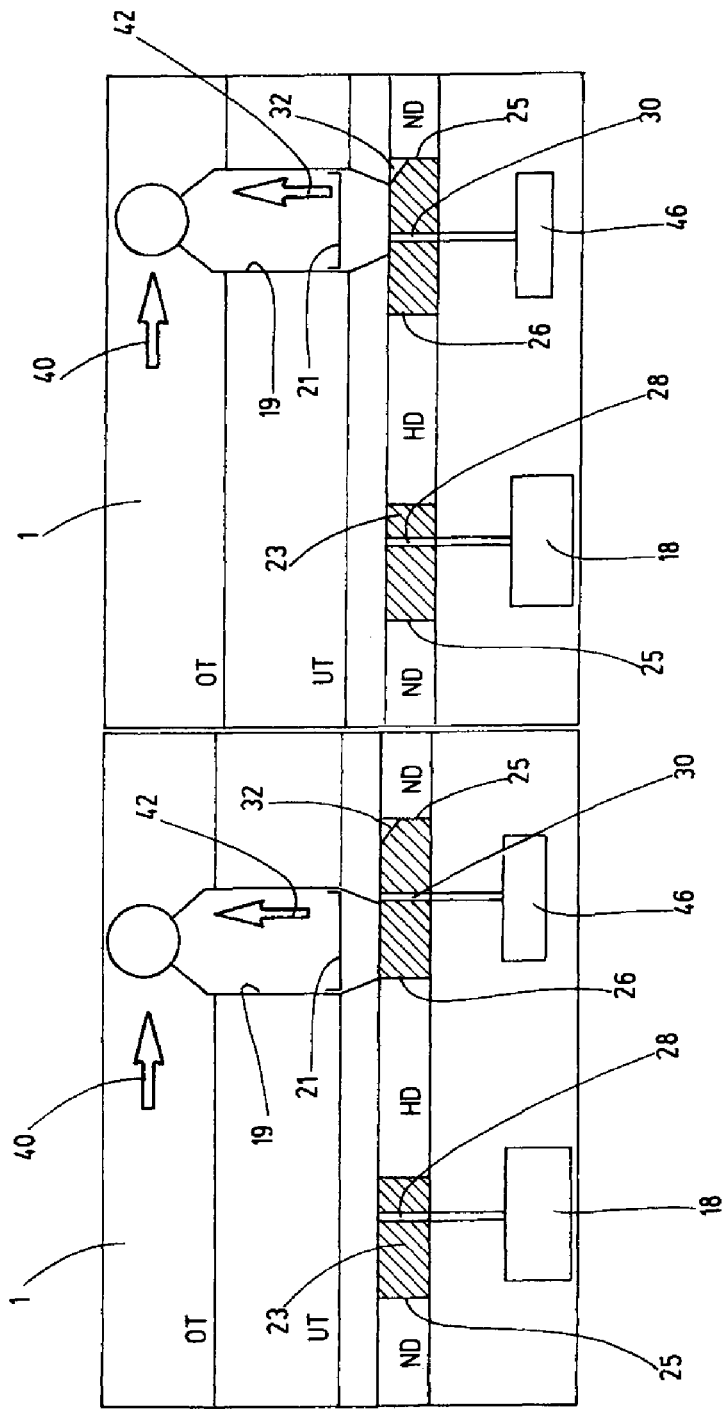

FIGS. 4 to 6 show the duty cycle for a single cylinder 19 of the cylinder drum 1 in the form of a functional diagram with the control disk 23 in a developed view. The rotational direction is designated by arrows 40 and the direction of the piston stroke is designated by arrows 42. The upper dead point OT and lower dead point UT are shown. Corresponding to the direction of rotation designated by arrow 40, FIG. 4 illustrates a process in which, when the piston 21 is at its top dead point, after the end of a suction process, the connection to the fluid channel 25 of the low-pressure side closes. Then, cf. left side of FIG. 4, the compression chamber bore 28 opens. This initiates a pressure build-up in the volume of the cylinder 19 by supply from the compression chamber 18 even before the connection to the high-pressure side fluid passage 26 opens. This state after completion of the suction stroke of the piston 21 is shown on the left side in FIG. 5, where the connection to the high-pressure side fluid passage 26 is now opened. At the same time, the compression chamber 18 is still connected with the cylinder 19 via the compression chamber bore 28, so that the compression chamber 18 is now charged from the pressure-side fluid passage 26. In the further progress of the working cycle, as shown on the right side in FIG. 5, the delivery stroke of the piston 21 is carried out, while the connection to the compression chamber 18 via the compression chamber bore 28 is already broken. The left side of FIG. 6 illustrates the situation in which, at the start of a suction stroke of the piston 21, the connection via the relief hole 30 to a tank 46, serving as a pressure sink, begins to open. This operation results in the relief of residual pressure from the cylinder 19 before the connection with the low-pressure side fluid passage 25 is established, as shown on the right side in FIG. 6. More precisely, the connection to the low-pressure side fluid passage 25 is not established suddenly over the full cross-section of the fluid channel 25, but gently on the control notch 32, as shown on the right side in FIG. 6.

By connecting to the compression chamber 18, the pressure in the cylinder 19 is elevated from "suction pressure" to "working pressure" before the opening of the high-pressure side fluid passage 26 is achieved. For this purpose, pressure is obtained from the compression chamber 18. After achieving the connection to the high-pressure side fluid passage 26, it is connected with the compression chamber 18 via the cylinder volume and the compression chamber bore 28 so that the pressure in the compression chamber 18 is raised back to the existing operating pressure before the next piston 21 reaches the reversal region. In conjunction with the smooth transition, achieved by the control notch 32, and the previously effected pressure relief via the relief hole 30, cf. the situation shown on the left side in FIG. 6, the overall result is an optimized operational behavior with a minimum of pressure pulsations.

While one embodiment has been chosen to illustrate the invention, it will be understood by those skilled in the art that various changes and modifications can be made therein without departing from the scope of the invention as defined in the claims.

The invention claimed is:

1. A hydraulic axial piston pump, comprising: a pump housing including a connecting plate with a stationary fluid inlet and a stationary fluid outlet; an axis in said pump housing; a drivable cylinder drum rotatable about said axis within said pump housing; a swash plate in said pump housing; a plurality of piston-cylinder units disposed in a circle at an offset in said cylinder drum, said piston-cylinder units including swept volumes and pistons supported at least indirectly on said swash plate by actuating ends of said pistons, said actuating ends being accessible from outside said cylinder drum; a control device between said swept volumes and said fluid inlet and said fluid outlet, said control device having fluid channels for transferring fluid from said fluid inlet into said swept volumes and from said swept volumes to said fluid outlet; a first pressure compensation channel being in said control device between said fluid channels and being selectively connectable to said swept volumes for establishing or relieving fluid pressure in said swept volumes, said first compensation channel being on said control device such that only one of said swept volumes is connectable to a first high pressure compression chamber at a time, said first high pressure compression chamber extending in a lower housing part of said pump housing with a longitudinal axis of said first high pressure compression chamber being disposed radially outward relative to said axis in said pump housing; and a second pressure compensation channel selectively connecting only one of said swept volumes to a pressure sink at a time, said pressure sink being a tank connectable to a respective one of said fluid channels only via one of said swept volumes, said second pressure compensation channel being arranged on said control device such that said second pressure compensation channel is closable to one of said swept volumes only after a connection to that swept volume from said fluid inlet is established whereby that swept volume is connected to said second pressure compensation channel and said fluid inlet at a same time.

2. A hydraulic axial piston pump according to claim 1 wherein
said first pressure compensation channel is arranged on said control device such that said first pressure compensation channel is connectable to one of said swept volumes only after a connection to that swept volume from said fluid inlet is closed.

3. A hydraulic axial piston pump according to claim 2 wherein
said first pressure compensation channel is arranged on said control device such that a connection of said first pressure compensation channel to one of said swept volumes is closable only after a connection from that swept volume to said fluid outlet is established.

4. A hydraulic axial piston pump according to claim 1 wherein
said first pressure compensation channel is arranged on said control device such that a connection of said first pressure compensation channel to one of said swept volumes is closable only after a connection from that swept volume to said fluid outlet is established.

5. A hydraulic axial piston pump according to claim 1 wherein
said second pressure compensation channel is arranged on said control device such that said second pressure compensation channel is connectable to one of said swept volumes only after a connection of that swept volume to said fluid outlet is closed.

6. A hydraulic axial piston pump according to claim 1 wherein
said control device comprises a stationary control disk in said pump housing.

7. A hydraulic axial piston pump according to claim 6 wherein
said control disk forms a bottom of said swept volumes of said piston-cylinder units.

8. A hydraulic axial piston pump according to claim 6 wherein
said control disk comprises kidney-shaped fluid channels forming connections to said piston-cylinder units.

9. A hydraulic axial piston pump according to claim 6 wherein
said first pressure compensation channel has a form of a drilled hole in said control disk.

10. A hydraulic axial piston pump according to claim 6 wherein
said control disk is on said connecting plate of said pump housing, said compression chamber being in said connecting plate and being connected to said first pressure compensation channel via a connecting channel.

11. A hydraulic axial piston pump according to claim 10 wherein
said first high pressure compression chamber is closed by a screw plug.

12. A hydraulic axial piston pump according to claim 6 wherein
said control disk comprises kidney-shaped fluid channels forming connections to said piston-cylinder units; and
said first and second pressure compensation channels are diametrically opposite one another on said control disk and between said kidney-shaped fluid channels.

13. A hydraulic axial piston pump according to claim 1 wherein
a second high pressure compression chamber extends in said lower housing part parallel to said first high pressure compression chamber and is connected in fluid communication with said first high pressure compression chamber by a connecting bore extending between said first and second high pressure compression chambers.

* * * * *